US012608944B2

(12) United States Patent
Kohata et al.

(10) Patent No.: US 12,608,944 B2
(45) Date of Patent: Apr. 21, 2026

(54) INFORMATION PROCESSING PROGRAM, INFORMATION PROCESSING METHOD, AND INFORMATION PROCESSING DEVICE

(71) Applicant: Fujitsu Limited, Kawasaki (JP)

(72) Inventors: Shun Kohata, Setagaya (JP); Takashi Kikuchi, Kunitachi (JP)

(73) Assignee: Fujitsu Limited, Kawasaki (JP)

( * ) Notice: Subject to any disclaimer, the term of this patent is extended or adjusted under 35 U.S.C. 154(b) by 333 days.

(21) Appl. No.: 18/464,396

(22) Filed: Sep. 11, 2023

(65) Prior Publication Data

US 2024/0203125 A1      Jun. 20, 2024

(30) Foreign Application Priority Data

Dec. 14, 2022      (JP) ................................. 2022-199826

(51) Int. Cl.
| | |
|---|---|
| *G06V 20/52* | (2022.01) |
| *G06T 7/20* | (2017.01) |
| *G06T 7/70* | (2017.01) |
| *G06V 10/25* | (2022.01) |
| *G06V 10/764* | (2022.01) |
| *G06V 40/20* | (2022.01) |

(52) U.S. Cl.
CPC ................ *G06V 20/52* (2022.01); *G06T 7/20* (2013.01); *G06T 7/70* (2017.01); *G06V 10/25* (2022.01); *G06V 10/764* (2022.01); *G06V 40/20* (2022.01); *G06V 2201/07* (2022.01)

(58) Field of Classification Search
CPC ...... G06V 20/52; G06V 10/25; G06V 10/764; G06V 40/20; G06V 2201/07; G06V 10/82; G06V 20/44; G06T 7/20; G06T 7/70; G06Q 20/203; G06Q 30/0201
See application file for complete search history.

(56) References Cited

U.S. PATENT DOCUMENTS

| | | |
|---|---|---|
| 2016/0203499 A1 | 7/2016 | Yamashita et al. |
| 2021/0201263 A1 | 7/2021 | Glaser et al. |

FOREIGN PATENT DOCUMENTS

| | | |
|---|---|---|
| JP | 2022-165483 | 11/2022 |

OTHER PUBLICATIONS

Sun Xu et al., "Human Object Interaction Detection via Multi-level Conditioned Network", Proceedings of the 14th ACM Web Science Conference 2022, ACMPUB27, New York, NY, USA, Jun. 8, 2020, pp. 26-34, XP059032211.
EESR—Extended European Search Report of European Patent Application No. 23195671.5 dated Nov. 21, 2023 [8 pages].

*Primary Examiner* — Qian Yang
(74) *Attorney, Agent, or Firm* — Fujitsu Intellectual Property Center

(57) ABSTRACT

A non-transitory computer-readable recording medium stores an information processing program for causing a computer to execute a process including: obtaining video obtained by imaging an inside of a store; analyzing the obtained video to specify, from the video, a first area that includes a product arranged in the store, a second area that includes a customer to purchase the product, and a relationship in which interaction between the product and the customer is identified; generating attention information that indicates a degree of attention of a location where the product is arranged based on the specified relationship; and causing a display device to output the generated attention information.

15 Claims, 14 Drawing Sheets

FIG. 3

| CAMERA ID | INSTALLATION LOCATION |
|---|---|
| 1 | BABY GOODS SALES FLOOR |
| 2 | SPORTING GOODS SALES FLOOR |
| 3 | FURNITURE SALES FLOOR: BED |
| 4 | FURNITURE SALES FLOOR: SHELVES |
| ... | ... |
| 101 | ACCOUNTING MACHINE A |
| 102 | ACCOUNTING MACHINE B |
| 103 | ACCOUNTING MACHINE C |
| ... | ... |

FIG. 4

| PRODUCT ID | PRODUCT NAME | ARRANGEMENT LOCATION | AREA COORDINATES |
|---|---|---|---|
| 1 | BABY MILK | BABY GOODS SALES FLOOR | {(400,100),(560,250), (560,320),(400,170)} |
| 2 | FOLLOW-UP MILK | BABY GOODS SALES FLOOR | {(400,175),(560,325), (560,395),(400,260)} |
| 3 | BABY BOTTLE | BABY GOODS SALES FLOOR | {(400,265),(560,315), (560,415),(400,365)} |
| ... | ... | ... | ... |

FIG. 6

| ACCOUNTING MACHINE ID | CUSTOMER ID | PURCHASED PRODUCT ID | PURCHASE QUANTITY |
|---|---|---|---|
| 101 | 1234 | 10 | 3 |
| 101 | 1234 | 20 | 2 |
| 101 | 1234 | 30 | 1 |
| ... | ... | ... | ... |

FIG. 7

| PRODUCT ID | PRODUCT NAME | ARRANGEMENT LOCATION | RELATIONSHIP | ACTUAL QUANTITY | PURCHASE QUANTITY |
|---|---|---|---|---|---|
| 1 | BABY MILK | BABY GOODS SALES FLOOR | SHORT-TIME VIEWING | 123 | - |
| 1 | BABY MILK | BABY GOODS SALES FLOOR | LONG-TIME VIEWING | 45 | - |
| 1 | BABY MILK | BABY GOODS SALES FLOOR | TOUCHING | 43 | - |
| 1 | BABY MILK | BABY GOODS SALES FLOOR | GRASPING | 21 | 19 |
| ... | ... | ... | ... | ... | ... |
| 101 | BABY MILK | POWDERED DRINK SALES FLOOR | SHORT-TIME VIEWING | 34 | - |
| 101 | BABY MILK | POWDERED DRINK SALES FLOOR | LONG-TIME VIEWING | 5 | - |
| 101 | BABY MILK | POWDERED DRINK SALES FLOOR | TOUCHING | 4 | - |
| 101 | BABY MILK | POWDERED DRINK SALES FLOOR | GRASPING | 3 | 2 |
| ... | ... | ... | ... | ... | ... |

INPUT: IMAGE DATA

HOID

OUTPUT: BBOX OF PERSON, CLASS NAME OF PERSON, BBOX OF OBJECT, CLASS NAME OF OBJECT, PROBABILITY VALUE OF INTERACTION BETWEEN PERSON AND OBJECT, AND CLASS NAME OF INTERACTION BETWEEN PERSON AND OBJECT 261    262

Frame i
i + 1
i + 2
i + 3 i + n

INFORMATION PROCESSING PROGRAM, INFORMATION PROCESSING METHOD, AND INFORMATION PROCESSING DEVICE

CROSS-REFERENCE TO RELATED APPLICATION

This application is based upon and claims the benefit of priority of the prior Japanese Patent Application No. 2022-199826, filed on Dec. 14, 2022, the entire contents of which are incorporated herein by reference.

FIELD

The embodiment discussed herein is related to an information processing program, an information processing method, and an information processing device.

BACKGROUND

There is an approach to improve a conversion rate by analyzing behavior exhibited when a person who visits a retail store or the like purchases a product, which is what is called purchasing behavior. For example, in a case where a person who compares items less than five times has a high tendency to purchase an item while a person who compares items equal to or more than five times has a high tendency to leave without purchasing an item in a clothing store, a conversion rate may be improved by guiding the number of try-on items to less than five at the time of service.

Japanese Laid-open Patent Publication No. 2022-165483 is disclosed as related art.

SUMMARY

According to an aspect of the embodiments, a non-transitory computer-readable recording medium stores an information processing program for causing a computer to execute a process including: obtaining video obtained by imaging an inside of a store; analyzing the obtained video to specify, from the video, a first area that includes a product arranged in the store, a second area that includes a customer to purchase the product, and a relationship in which interaction between the product and the customer is identified; generating attention information that indicates a degree of attention of a location where the product is arranged based on the specified relationship; and causing a display device to output the generated attention information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating exemplary information stored in a camera installation DB 14 according to the present embodiment;

FIG. 4 is a diagram illustrating exemplary information stored in a product DB 15 according to the present embodiment;

FIG. 6 is a diagram illustrating exemplary information stored in an accounting registration DB 16 according to the present embodiment;

FIG. 7 is a diagram illustrating exemplary information stored in an attention DB 18 according to the present embodiment;

DESCRIPTION OF EMBODIMENTS

However, even for the same product, behavior exhibited by a customer may change depending on a location of a shelf or the like where the product is arranged. In other words, it is considered that the customer may easily exhibit purchasing behavior at some place and may hardly exhibit purchasing behavior at some other place depending on the location where the product is arranged. Therefore, it is considered that analysis of the purchasing behavior of the customer due to a difference in the location where the product is arranged leads to improvement in the conversion rate.

In one aspect, an object is to provide an information processing program, an information processing method, and an information processing device capable of more accurately analyzing purchasing behavior of a customer due to a difference in a location where a product is arranged.

Hereinafter, examples of an information processing program, an information processing method, and an information processing device according to the present embodiment will be described in detail with reference to the drawings. Note that the present embodiment is not limited by the examples. Furthermore, the individual examples may be appropriately combined within a range without inconsistency.

Figure 1:
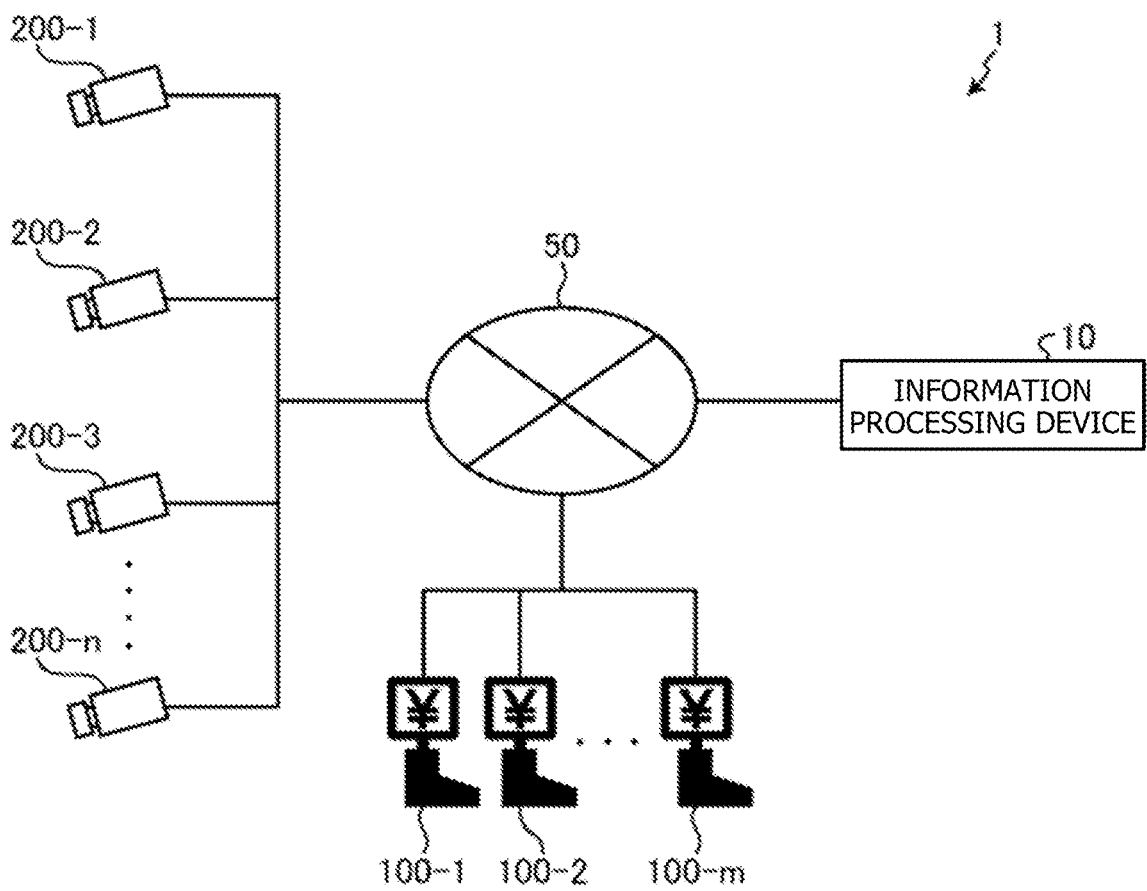
FIG. 1 is a diagram illustrating an exemplary configuration of an information processing system according to the present embodiment.

First, an information processing system for implementing the present embodiment will be described. FIG. 1 is a diagram illustrating an exemplary configuration of the information processing system according to the present embodiment. As illustrated in FIG. 1, an information processing system 1 is a system in which an information processing device 10, accounting machines 100-1 to 100-$m$, and camera devices 200-1 to 200-$n$ are communicably coupled to each other via a network 50. Note that m and n are any natural numbers, and hereinafter, the accounting machines 100-1 to 100-$m$ and the camera devices 200-1 to 200-$n$ may be collectively referred to as an "accounting machine 100" and a "camera device 200", respectively.

For the network 50, various communication networks, such as an intranet used in a store of a retail store and the like, may be adopted regardless of whether it is wired or wireless, for example. Furthermore, the network 50 may not be a single network, and may be, for example, the intranet and the Internet configured via a network device such as a gateway or another device (not illustrated). Note that the expression "in a store" of a retail store or the like is not limited to indoors, and may include outdoors within the premises of the retail store or the like.

The information processing device 10 is, for example, an information processing device such as a desktop personal computer (PC), a laptop PC, a server computer, or the like installed in a store of a retail store and the like and used by a store staff, an administrator, and the like. Alternatively, the information processing device 10 may be a cloud computer device managed by a service provider that provides cloud computing services.

For example, the information processing device 10 receives, from the camera device 200, video obtained by imaging a predetermined imaging range such as each sales floor, a checkout area, and the like in a store of a retail store and the like using the camera device 200. Note that the video technically includes a plurality of captured images imaged by the camera device 200, that is, a series of frames of a moving image.

Furthermore, the information processing device 10 extracts products arranged in the store and customers staying in the store from the video imaged by the camera device 200 using, for example, an existing object detection technique. Furthermore, the information processing device 10 specifies, for example, a relationship in which interaction between a product and a customer is identified, such as that the client views the product for a short time or a long time, touches the product, grasps the product, sits on the product, or the like. Alternatively, for example, the information processing device 10 generates attention information indicating a degree of attention of a location of a shelf or the like where the product is arranged based on the specified relationship, and causes a display device to output the attention information. Furthermore, for example, the information processing device 10 may specify a type of the relationship indicated by the customer, such as grasping the product, count the actual quantity for each type of the relationship, and cause the display device to output the result in association with the attention information. Note that the display device may be a device included in the information processing device 10, may be an external device, or may be a device included in another information processing device communicably coupled to the information processing device 10 via the network 50.

Furthermore, for example, the information processing device 10 tracks the customer extracted from the video, and further analyzes the video to identify the accounting machine 100 used by the tracked customer.

Furthermore, the information processing device 10 specifies the purchase quantity of products arranged at a location in the store where the customer has presented a predetermined relationship based on, for example, registration information obtained from the identified accounting machine 100. Then, for example, the information processing device 10 causes the display device to output the specified purchase quantity for each location where the products are arranged in the store in association with the attention information indicating the degree of attention of the location where the products are arranged.

Then, by analyzing the attention information output to the display device, the store staff or the like is enabled to analyze, for example, whether the purchase quantity actually changes depending on a location of a shelf or the like where the product is arranged and where the customer has presented a predetermined relationship, such as grasping the product. In other words, the store staff or the like is enabled to analyze, for example, using the attention information, whether the purchase quantity of the product changes when the location where the product is arranged is changed even for the same product.

Furthermore, the information processing device 10 is enabled to determine whether the person extracted from the video is a salesclerk or a customer using, for example, a machine learning model, and to identify the customer. As a result, the information processing device 10 is enabled to exclude the salesclerk from the processing target and the analysis target.

Note that, while FIG. 1 illustrates the information processing device 10 as one computer, it may be a distributed computing system including a plurality of computers.

The accounting machine 100 is, for example, a cash register terminal to be operated by a salesclerk to register information regarding a purchased product, or a self-checkout terminal to be operated by a customer him/herself to register information regarding a purchased product. For example, the customer pays for the purchased product with cash, a credit card, electronic money, or the like based on the information regarding the purchased product registered via the accounting machine 100. Furthermore, the accounting machine 100 transmits, as registration information, the registered information regarding the purchased product to the information processing device 10, for example. Note that the term accounting machine is an example, and may also be referred to as, for example, self checkout, automated checkout, a self-checkout machine, a self-check-out register, or the like.

The camera device 200 is, for example, a monitoring camera installed in each sales floor and a checkout area in a store of a retail store and the like. The video imaged by the camera device 200 is transmitted to the information processing device 10. Furthermore, positional information, such as coordinates, for identifying each product and a sales floor area is allocated to each product and the sales floor area to be imaged by the camera device 200, and for example, the information processing device 10 is enabled to identify each product and the sales floor area from the video received from the camera device 200.

(Functional Configuration of Information Processing Device 10)

Figure 2:
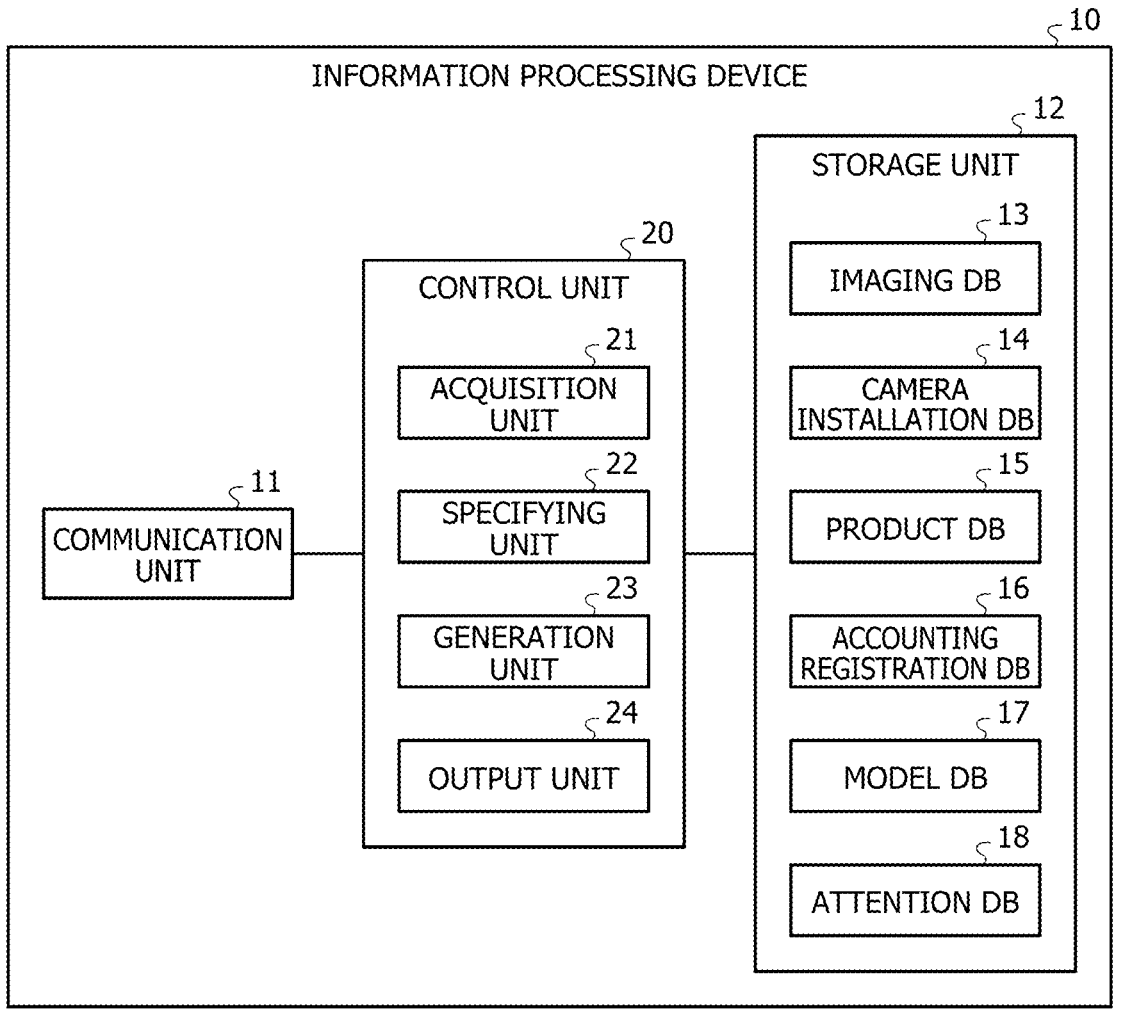
FIG. 2 is a diagram illustrating an exemplary configuration of an information processing device 10 according to the present embodiment.

Next, a functional configuration of the information processing device 10 will be described. FIG. 2 is a diagram illustrating an exemplary configuration of the information processing device 10 according to the present embodiment. As illustrated in FIG. 2, the information processing device 10 includes a communication unit 11, a storage unit 12, and a control unit 20.

The communication unit 11 is a processing unit that controls communication with another device such as the camera device 200, and is, for example, a communication interface such as a network interface card.

The storage unit 12 has a function of storing various kinds of data and programs to be executed by the control unit 20, and is implemented by, for example, a storage device such as a memory, a hard disk, or the like. The storage unit 12 stores an imaging DB 13, a camera installation DB 14, a product DB 15, an accounting registration DB 16, a model DB 17, an attention DB 18, and the like. Note that the DB is an abbreviation for a database.

The imaging DB 13 stores a plurality of captured images, which is a series of frames captured by the camera device 200. The plurality of captured images imaged by the camera device 200, which is the video, is transmitted from the camera device 200 as needed, received by the information processing device 10, and stored in the imaging DB 13.

The camera installation DB 14 stores, for example, information for identifying a location where each of the camera devices 200 is installed. The information stored here may be set in advance by, for example, the administrator or the like. FIG. 3 is a diagram illustrating exemplary information stored in the camera installation DB 14 according to the present embodiment. As illustrated in FIG. 3, the camera installation DB 14 stores, for example, individual pieces of information such as "camera ID, installation location", and the like in association with each other. In the "camera ID" stored here, for example, information such as an identifier for uniquely identifying each of the camera devices 200 is set, and in the "installation location", for example, information for identifying a location where each of the camera devices 200 is installed is set. The example of FIG. 3 illustrates an exemplary case where a camera with camera ID=1 is installed in a baby goods sales floor and a camera with camera ID=101 is installed in a checkout area where an accounting machine A is located.

Returning to the description of FIG. 2, the product DB 15 stores, for example, information regarding products arranged in each sales floor. The information stored here may also be set in advance by, for example, the administrator or the like. FIG. 4 is a diagram illustrating exemplary information stored in the product DB 15 according to the present embodiment. As illustrated in FIG. 4, the product DB 15 stores, for example, individual pieces of information such as "product ID, product name, arrangement location, area coordinates", and the like in association with each other. In the "product ID" stored here, for example, information such as an identifier for uniquely identifying each product is set, and in the "product name", for example, names of individual products are set. Furthermore, in the "arrangement location", for example, information for identifying a location where each product is arranged is set. Note that each product and a location where each product is arranged may be associated with each of the camera devices 200 and a location where the camera device 200 is installed by, for example, setting the same information as the "installation location" of the camera installation DB 14 in the "arrangement location". Furthermore, in the "area coordinates", for example, positional information of pixels of a location where each product is arranged in the captured image imaged by the camera device 200 may be set. The positional information will be described more specifically with reference to FIG. 5.

Figure 5:
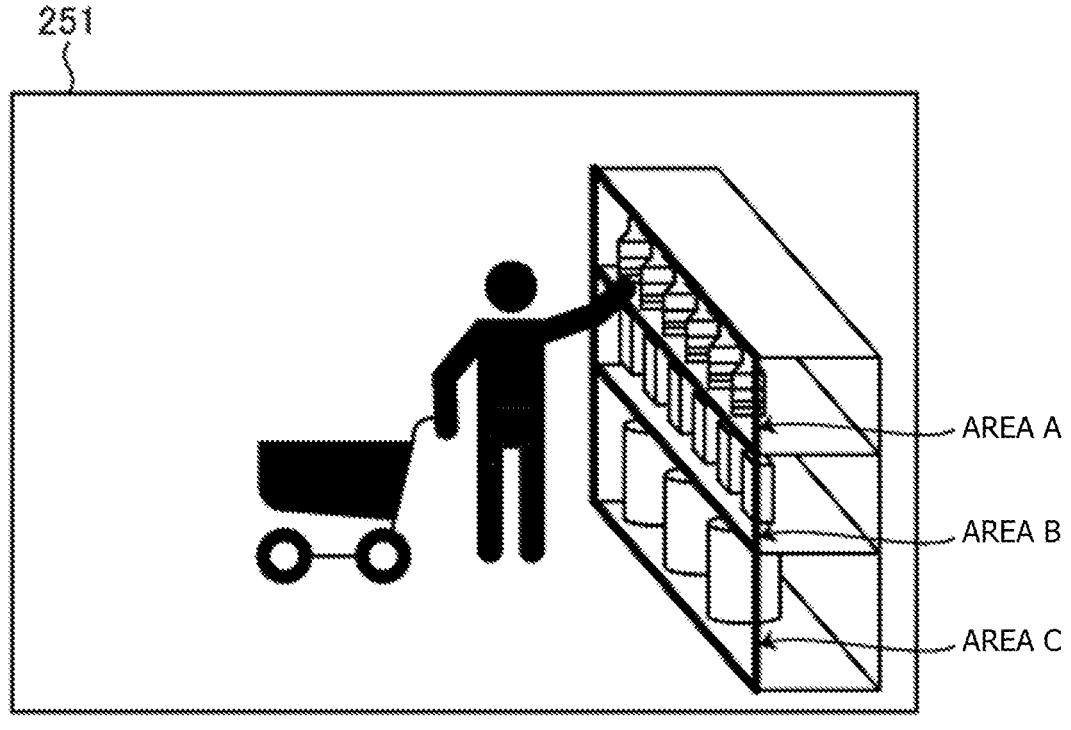
FIG. 5 is a diagram illustrating an exemplary area of a product arrangement location according to the present embodiment.

FIG. 5 is a diagram illustrating an exemplary area of a product arrangement location according to the present embodiment. FIG. 5 is a diagram illustrating a captured image 251 of a certain sales floor imaged by the camera device 200. The captured image 251 includes areas A to C including a location where individual products are arranged. The information processing device 10 is enabled to more precisely identify the location where each product is arranged by setting the positional information of each area in the captured image 251 as illustrated in FIG. 5, for example, the coordinates of each vertex of each area in the "area coordinates" of the product DB 15. Note that, while the captured image 251 including the plurality of product arrangement locations has been described with reference to FIG. 5, one product arrangement location may be imaged by the camera device 200, for example. In this case, the product arrangement location is determined for each captured image imaged by the camera device 200, and thus the "area coordinates" are not necessarily stored in the product DB 15.

Returning to the description of FIG. 2, the accounting registration DB 16 stores, for example, information regarding a purchased product registered via the accounting machine 100. The information regarding the purchased product registered via the accounting machine 100 is transmitted from the accounting machine 100 as needed, received by the information processing device 10, and stored in the accounting registration DB 16. FIG. 6 is a diagram illustrating exemplary information stored in the accounting registration DB 16 according to the present embodiment. As illustrated in FIG. 6, the accounting registration DB 16 stores, for example, individual pieces of information such as "accounting machine ID, customer ID, purchased product ID, purchase quantity", and the like in association with each other. In the "accounting machine ID" stored here, for example, information such as an identifier for uniquely identifying the accounting machine 100 is set. Furthermore, in the "customer ID", information such as an identifier for uniquely identifying the customer who uses the accounting machine 100, the customer being extracted from the video and tracked by the information processing device 10, is set. Furthermore, in the "purchased product ID", for example, information such as an identifier for uniquely identifying each of the purchased products is set. Note that the product DB 15 and the accounting registration DB 16 may be associated with each other by, for example, setting the same information as the "product ID" of the product DB 15 in the "purchased product ID". Furthermore, in the "purchase quantity", for example, the number of items of the purchased products is set.

Returning to the description of FIG. 2, the model DB 17 stores, for example, information regarding a machine learning model for specifying an area including a product and a customer and a relationship between the product and the customer from a captured image in the store, and model parameters for constructing the model. The machine learning model is generated through machine learning using, for example, video, which is captured images obtained by imaging the inside of the store with the camera device 200, as input data, and an area including a product and a customer and a type of a relationship between the product and the customer as ground truth labels. Note that the type of the relationship between the product and the customer may be, for example, an action of the customer such as viewing the product for a short time or a long time, touching the product, grasping the product, sitting on the product, or the like, but it is not limited to those actions. Furthermore, the area including the product and the customer may be, for example, a bounding box (Bbox) that rectangularly surrounds the area in the captured image.

Furthermore, the model DB 17 may store, for example, information regarding a machine learning model for determining whether a person identified from a captured image in the store is a salesclerk or a customer, and model parameters for constructing the model. The machine learning model is generated through machine learning using, for example, partial images of a person extracted from video obtained by imaging the inside of the store with the camera device 200 as input data and information indicating whether the person is a salesclerk or a customer as a ground truth label.

Note that, hereinafter, the machine learning model for specifying a relationship between a product and a customer and the like and the machine learning model for determining whether a person is a salesclerk or a customer may be referred to as a "product/customer relationship specifying model" and a "salesclerk/customer determination model", respectively, to make them distinguishable from each other. Furthermore, the product/customer relationship specifying model and the salesclerk/customer determination model may be trained and generated by the information processing device 10, or may be trained and generated by another information processing device.

The attention DB 18 stores, for example, attention information indicating a degree of attention of a location of a shelf or the like where products are arranged. FIG. 7 is a diagram illustrating exemplary information stored in the attention DB 18 according to the present embodiment. The attention information stored here may be generated and set by the generation unit 23 based on, for example, information such as the relationship between the product and the customer specified by the specifying unit 22. As illustrated in FIG. 7, the attention DB 18 stores, for example, individual pieces of information such as "product ID, product name, arrangement location, relationship, actual quantity, purchase quantity", and the like in association with each other. In the "product ID" stored here, for example, information such as an identifier for uniquely identifying each product is set, and in the "product name", for example, names of individual products are set. Furthermore, in the "arrangement location", for example, information for identifying a location where each product is arranged is set. Furthermore, in the "relationship", for example, a type of the specified relationship between the product and the customer is set. Furthermore, in the "actual quantity", for example, an actual quantity for each type of the relationship presented by the customer is set. Furthermore, in the "purchase quantity", for example, a purchase quantity of products arranged at a predetermined arrangement location and having a predetermined relationship presented by the customer. More specifically, in the example of FIG. 7, individual customers who present a relationship of grasping baby milk arranged at individual arrangement locations are tracked, and the purchase quantity is set based on the information regarding the purchased products registered via the accounting machine 100 used by the individual customers.

The example of FIG. 7 indicates that the individual customers present the relationship of grasping the baby milk arranged in a baby goods sales floor 21 times, and that the purchase quantity is 19. Furthermore, it is indicated that the individual customers present the relationship of grasping the baby milk arranged in a powdered drink sales floor three times, and that the purchase quantity is 2. Note that, in the example of FIG. 7, since the product is baby milk, only the purchase quantity in the case where the relationship of grasping the product is presented is set on the premise that the relationship of grasping the product is presented to make a purchase. However, depending on the product, for example, in a case of a large-size product or the like, a customer may place an order with a salesclerk without grasping the product. Therefore, the purchase quantity of a relationship other than the relationship of grasping may be set by tracking a customer who presents a relationship other than the relationship of grasping.

Note that the information described above stored in the storage unit 12 is merely an example, and the storage unit 12 may store various kinds of information other than the information described above.

The control unit 20 is a processing unit that takes overall control of the information processing device 10, and is, for example, a processor or the like. The control unit 20 includes an acquisition unit 21, a specifying unit 22, a generation unit 23, and an output unit 24. Note that each processing unit is an example of an electronic circuit included in a processor, or an example of a process to be performed by the processor.

For example, the acquisition unit 21 obtains video obtained by imaging the inside of the store with the camera device 200 from the imaging DB 13. Note that the video obtained by imaging the inside of the store with the camera device 200 is transmitted to the information processing device 10 by the camera device 200 as needed, received by the information processing device 10, and stored in the imaging DB 13.

The specifying unit 22 analyzes the video obtained by the acquisition unit 21 to specify, from the video, a first area including a product arranged in the store, a second area including a customer to purchase the product, and a relationship in which interaction between the product and the customer is identified. Such a specifying process may include, for example, processing of inputting the video obtained by the acquisition unit 21 to the product/customer relationship specifying model, which is the machine learning model described, to specify the first area, the second area, and the relationship. Furthermore, the product/customer relationship specifying model may be a human object interaction detection (HOID) model trained to identify information regarding a first area, information regarding a second area, and interaction between a first class and a second class. Here, the information regarding the first area may be information indicating the first class indicating an object including a product and an area where the object appears, and the information regarding the second area may be information indicating the second class indicating a person who purchases the product and an area where the person appears. The HOID will be described more specifically with reference to FIG. 8.

Figure 8:
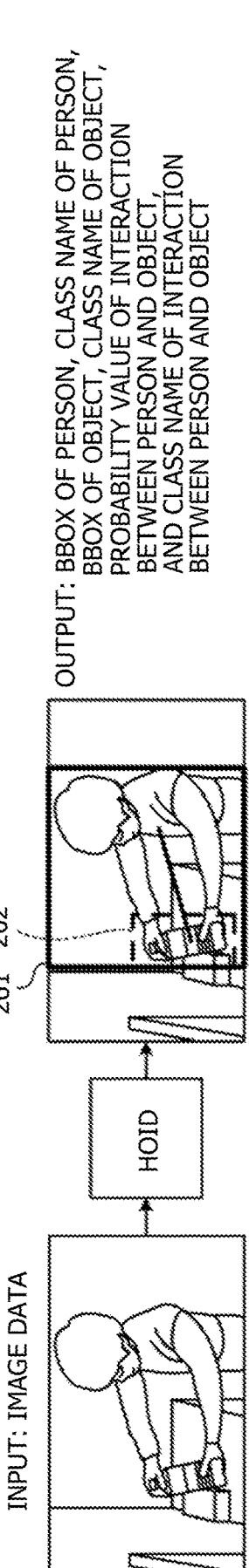
FIG. 8 is a diagram for explaining specification of a relationship by HOID.

FIG. 8 is a diagram for explaining specification of a relationship by the HOID. As illustrated in FIG. 8, the specifying unit 22 inputs image data, which is a captured image of the inside of the store, to the HOID machine learning model, and obtains an output result. As illustrated in FIG. 8, the output result includes, for example, a Bbox 261 of a person, a class name of the person, a Bbox 262 of an object, a class name of the object, a probability value of interaction between the person and the object, a class name of the interaction between the person and the object, and the like.

Returning to the description of FIG. 2, the specifying unit 22 specifies a type of the relationship indicated by each customer at a predetermined location where the product is arranged in the store based on, for example, the specified relationship and the position of the customer when the specified relationship is indicated. In such a specifying process, the type of the relationship may be specified based on, for example, the probability value of the interaction between the person and the object, the class name of the interaction between the person and the object, and the like output from the HOID machine learning model described with reference to FIG. 8. More specifically, for example, the specifying unit 22 specifies the type of the relationship indicated by the class name of the interaction having the highest probability value of the interaction between the person and the object, which is output from the HOID machine learning model, as a type of the relationship presented by the person with respect to the object. As an example, the specifying unit 22 specifies the action of "grasping" baby milk, which is the object, taken by the customer, who is the person present in the captured image, as a type of the relationship from the output result obtained by inputting the captured image of the baby goods sales floor to the HOID machine learning model. Furthermore, as another example, the specifying unit 22 specifies the action of "short-time viewing" of baby milk taken by the customer as a type of the relationship from the output result obtained by inputting the captured image of the powdered drink sales floor to the HOID machine learning model.

Furthermore, the specifying unit 22 counts, for example, the actual quantity for each type of the relationship presented by the customer at a predetermined location. More specifically, for example, the specifying unit 22 counts actual quantities of "short-time viewing", "long-time viewing", "grasping", and the like specified as types of the relationship presented by the customer with respect to the baby milk at the baby goods sales floor, which are respective numbers of times of specification. According to the actual quantity counted in this manner, for example, it becomes possible to make an analysis such as the baby milk has been grasped a large number of times at the baby goods sales floor while it has been hardly grasped at the powdered drink sales floor and has been only viewed for a short time a large number of times.

Furthermore, the specifying unit 22 specifies a location in the store where the customer has grasped the product based on, for example, a predetermined relationship and the position of the customer when the predetermined relationship is presented. Then, for example, the specifying unit 22 tracks the customer included in the video and analyzes the video, thereby identifying the accounting machine 100 used by the tracked customer. The tracking of the customer will be described more specifically with reference to FIG. 9.

Figure 9:
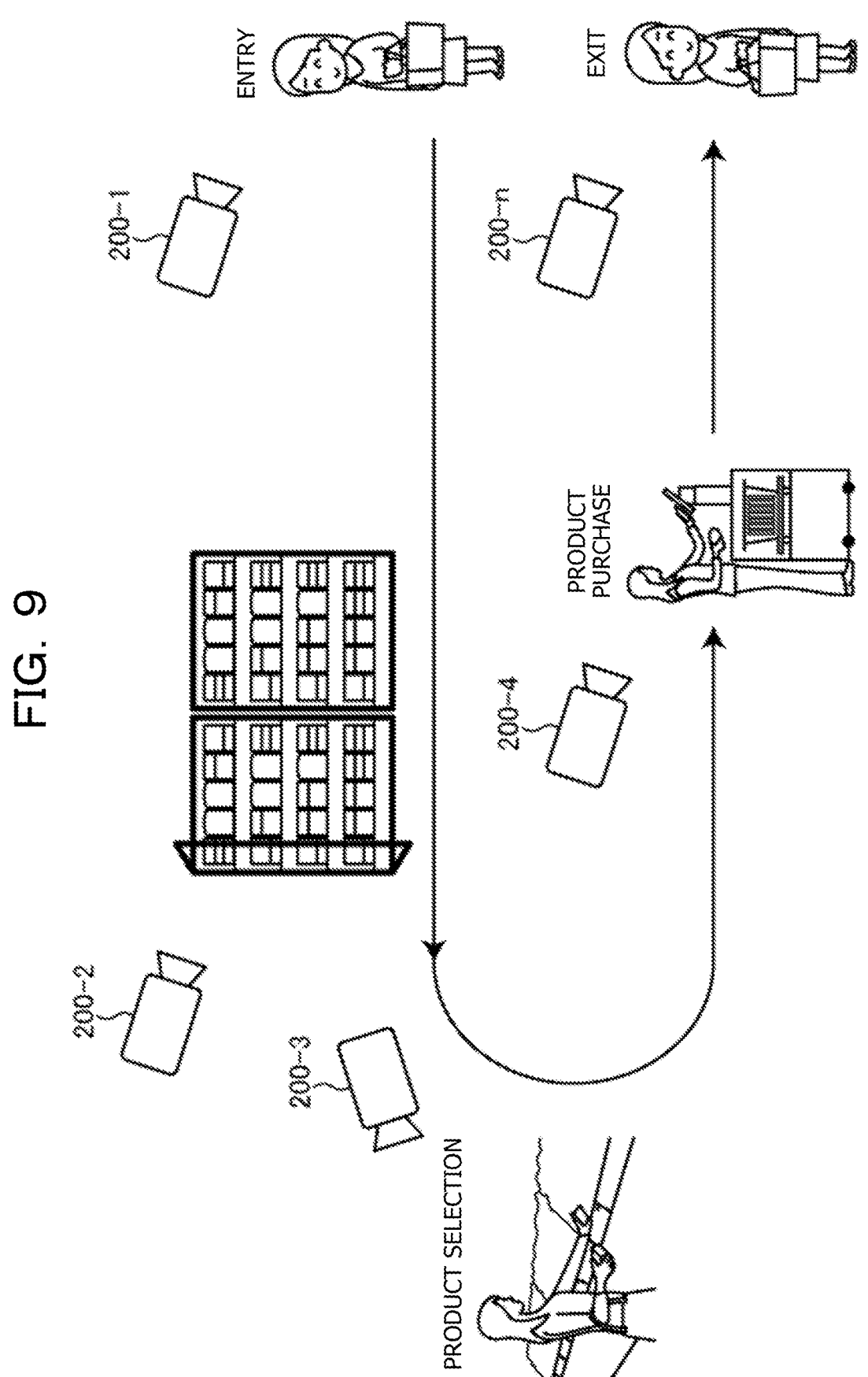
FIG. 9 is a diagram for explaining tracking of a customer.

FIG. 9 is a diagram for explaining the tracking of the customer. As illustrated in FIG. 9, the specifying unit 22 extracts persons from a plurality of pieces of image data captured by the camera devices 200 installed at various places such as an entrance of the store, each sales floor, a checkout area, an exit, and the like, identifies the same person from the extracted persons, and tracks each of the persons. The person extraction and tracking from the image data will be described more specifically with reference to FIG. 10.

Figure 10:
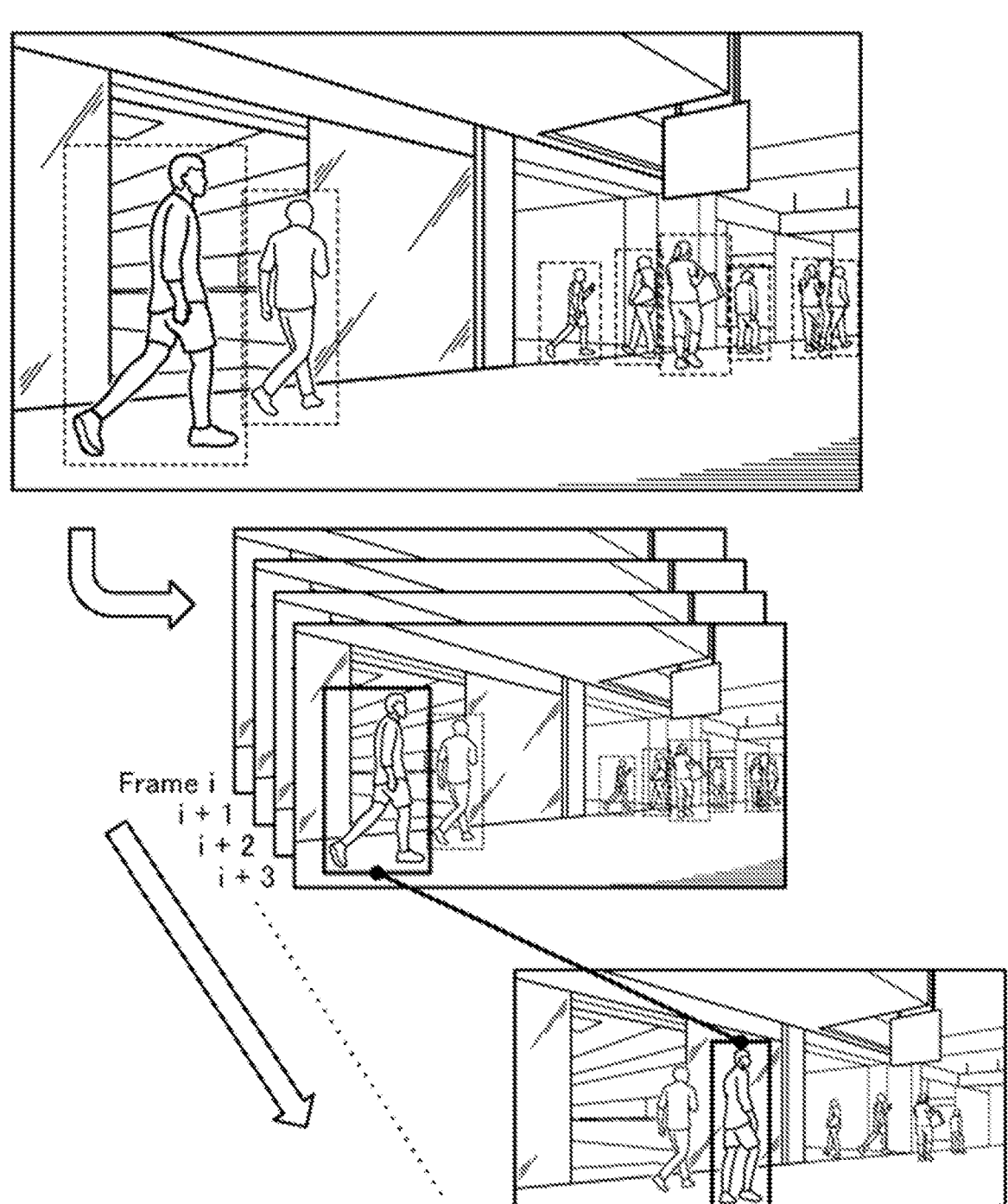
FIG. 10 is a diagram illustrating exemplary person extraction and tracking from in-store images according to the present embodiment.

FIG. 10 is a diagram illustrating exemplary person extraction and tracking from in-store images according to the present embodiment. As illustrated in FIG. 10, the specifying unit 22 extracts a person from the in-store images using, for example, an existing detection algorithm such as you only look once (YOLO), single shot multibox detector (SSD), region based convolutional neural networks (RCNN), or the like. The in-store images are individual pieces of image data captured by the camera device 200, and as illustrated in FIG. 10, for example, a person extracted from the image data is indicated by a Bbox that rectangularly surrounds the area in the image.

Furthermore, as illustrated in the upper part of FIG. 10, it is a matter of course that a plurality of persons may be extracted from the in-store images. Therefore, as illustrated in the lower part of FIG. 10, the specifying unit 22 identifies the same person between frames based on, for example, a similarity level of Bboxes of the persons among the plurality of pieces of image data, that is, among a plurality of frames. For example, an existing tracking algorithm such as tracking learning detection (TLD), kernelized correlation filters (KCF), or the like may be used to identify the same person.

Returning to the description of FIG. 2, the specifying unit 22 further specifies the purchase quantity of products arranged at a location in the store where the customer has presented a predetermined relationship based on, for example, the registration information obtained from the identified accounting machine 100. Note that the registration information is information regarding the purchased product registered via the accounting machine 100, which is transmitted to the information processing device 10 by the accounting machine 100 as needed, received by the information processing device 10, and stored in the accounting registration DB 16. According to the purchase quantity specified in this manner, for example, it becomes possible to make an analysis such as whether or not the baby milk grasped by the customer at the baby goods sales floor has been purchased. Furthermore, by comparing the actual quantity in which the customer has grasped the baby milk at the baby goods sales floor with the purchase quantity, it becomes possible to make an analysis such as how much the baby milk grasped at the baby goods sales floor has been purchased.

Furthermore, the specifying unit 22 is enabled to determine whether the person extracted from the video is a salesclerk or a customer using, for example, the salesclerk/customer determination model, which is the machine learning model described above, and to identify the customer. As a result, the information processing device 10 is enabled to exclude the salesclerk from the processing target and the analysis target, and to reduce the processing load of the information processing device 10. The process of the salesclerk/customer determination will be described more specifically with reference to FIG. 11.

Figure 11:
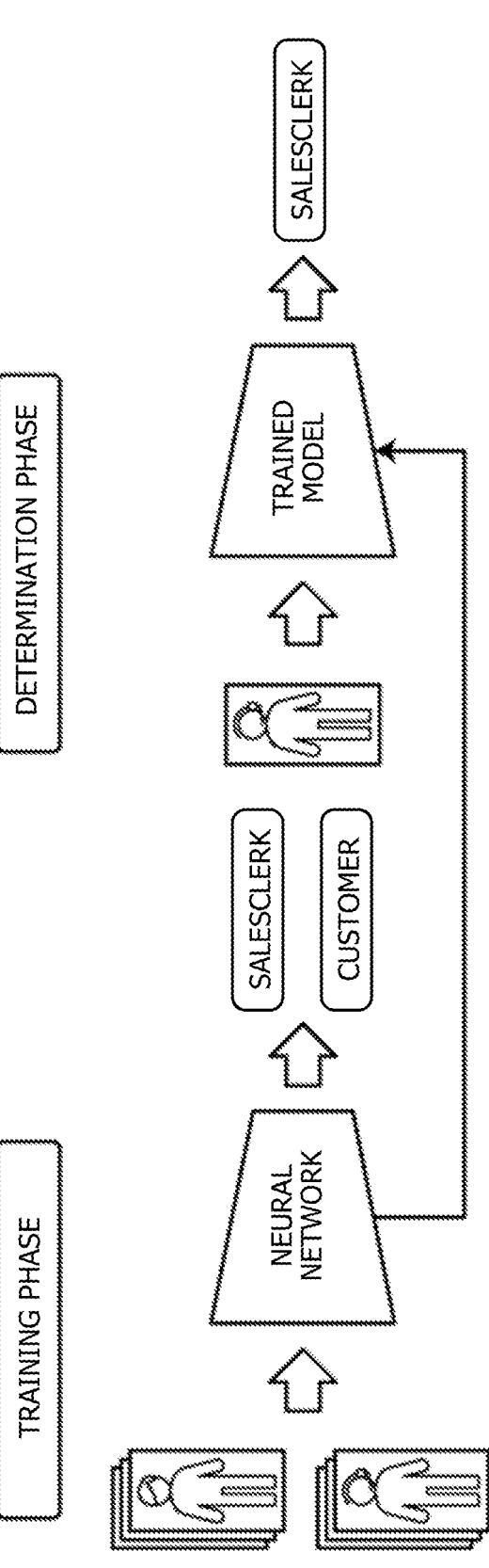
FIG. 11 is a diagram illustrating exemplary salesclerk/ customer determination according to the present embodiment.

FIG. 11 is a diagram illustrating exemplary salesclerk/customer determination according to the present embodiment. As illustrated on the left side of FIG. 11, in a training phase, the information processing device 10 trains and generates a salesclerk/customer determination model using partial images of a person extracted from the video as input data and information indicating whether the person is a salesclerk or a customer as a ground truth label. The partial image of the person in the input data may be an image in a Bbox that rectangularly surrounds the area of the person. Furthermore, for example, a neural network (NN) may be used as the salesclerk/customer determination model.

Next, as illustrated on the right side of FIG. 11, in a determination phase, the information processing device 10 inputs a partial image of a person extracted from the video of the camera device 200 to the salesclerk/customer determination model trained in the training phase, and determines whether the person is a salesclerk or a customer. Note that the example of FIG. 11 indicates that the person in the input partial image is determined to be a salesclerk.

Returning to the description of FIG. 2, the generation unit 23 generates attention information indicating a degree of attention of a location where the product is arranged based on, for example, the relationship in which the interaction between the product and the customer is identified, which is specified by the specifying unit 22. Examples of the attention information generated by the generation unit 23 include information stored in the attention DB 18 as illustrated in FIG. 7.

For example, the output unit 24 causes the display device to output the attention information generated by the generation unit 23. Furthermore, the output unit 24 may cause the display device to output, for example, the attention information as illustrated in FIG. 7 in which the actual quantity counted for each type of a relationship between the product and the customer presented by the customer is associated with a predetermined location where the relationship is presented. In particular, the output unit 24 may cause the display device to output, for example, the attention information as illustrated in FIG. 7 in which the actual quantity of the relationship indicating that the customer has grasped the product is associated with each location where the products are arranged. Moreover, the output unit 24 may cause the display device to output, for example, the attention information as illustrated in FIG. 7 in which the purchase quantity of the products arranged at the location in the store where the customer has presented a predetermined relationship is associated with each location where the products are arranged in the store.

(Process Flow)

Figure 12:
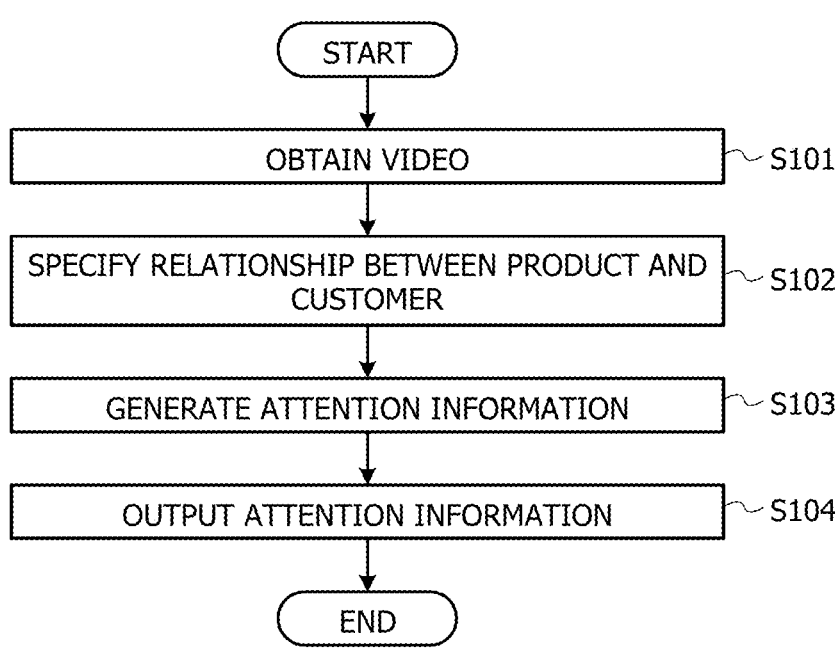
FIG. 12 is a flowchart illustrating a flow of an attention information output process according to the present embodiment.

Next, a flow of an attention information output process to be executed by the information processing device 10 will be described. FIG. 12 is a flowchart illustrating a flow of the attention information output process according to the present embodiment.

First, as illustrated in FIG. 12, the information processing device 10 obtains, from the imaging DB 13, for example, the video obtained by imaging a predetermined imaging range such as the inside of the store of the retail store with the camera device 200 (step S101). Note that the video imaged by the camera device 200 is transmitted from the camera device 200 to the information processing device 10 as needed, and stored in the imaging DB 13.

Next, the information processing device 10 inputs the video obtained in step S101 to, for example, the product/customer relationship specifying model, thereby specifying an area including a product, an area including a customer, and a relationship between the product and the customer from the video (step S102). Note that the area including the product or the customer may be, for example, a Bbox that rectangularly surrounds the product or the customer in the video. Furthermore, the relationship between the product and the customer may be, for example, an action of the customer such as "short-time viewing" or "long-time viewing" of the product, "touching" the product, "grasping" the product, "sitting" on the product, or the like.

Next, the information processing device 10 generates attention information indicating a degree of attention of a location where the product is arranged based on, for example, the relationship between the product and the customer specified in step S102 (step S103). Examples of the attention information generated in step S103 may include information stored in the attention DB 18 as illustrated in FIG. 7.

Next, the information processing device 10 causes the display device to output, for example, the attention information generated in step S103 (step S104). After the execution of step S104, the attention information output process illustrated in FIG. 12 is terminated.

Then, by analyzing the attention information output to the display device, the store staff or the like is enabled to analyze, for example, whether the purchase quantity actually changes depending on a location of a shelf or the like where the product is arranged and where the customer has presented a predetermined relationship, such as grasping the product. In other words, the store staff or the like is enabled to analyze, for example, using the attention information, whether the purchase quantity of the product changes when the location where the product is arranged is changed even for the same product.

Effects

As described above, the information processing device 10 obtains the video obtained by imaging the inside of the store, analyzes the obtained image to specify, from the video, the first area including a product arranged in the store, the second area including a customer to purchase the product, and the relationship in which interaction between the product and the customer is identified, generates attention information indicating a degree of attention of a location where the product is arranged based on the specified relationship, and causes the display device to output the generated attention information.

In this manner, the information processing device 10 specifies the relationship between the product and the customer from the video obtained by imaging the inside of the store, and generates and outputs the attention information of the product arrangement location based on the specified relationship. As a result, it becomes possible to more accurately analyze the purchasing behavior of the customer due to a difference in the location where the product is arranged.

Furthermore, the information processing device 10 specifies a type of the relationship indicated by each customer at a predetermined location where the product is arranged in the store based on the specified relationship and the position of the customer when the specified relationship is indicated, counts the actual quantity for each type of the relationship indicated by the customer at the predetermined location, and causes the display device to output the attention information in which the counted actual quantity is associated with the predetermined location.

As a result, it becomes possible to more accurately analyze the purchasing behavior of the customer due to a difference in the location where the product is arranged.

Furthermore, the information processing device 10 specifies the relationship indicating that the customer has grasped the product for each location based on the specified relationship and the position of the customer when the specified relationship is indicated, counts the actual quantity of the relationship indicating that the customer has grasped the product for each location, and causes the display device to output the attention information in which the counted actual quantity is associated with each location.

As a result, it becomes possible to more accurately analyze the purchasing behavior of the customer due to a difference in the location where the product is arranged.

Furthermore, the information processing device 10 specifies a location in the store where the customer has grasped the product based on the predetermined relationship and the position of the customer where the predetermined relationship is indicated, tracks the customer included in the video, analyzes the video to identify the accounting machine used by the tracked customer, specifies the purchase quantity of the products arranged at the location in the store where the customer has indicated the predetermined relationship based on the registration information obtained from the identified accounting machine, and causes the display device to output the attention information in which the purchase quantity is associated with each location in the store where the products are arranged.

As a result, it becomes possible to more accurately analyze the purchasing behavior of the customer due to a difference in the location where the product is arranged.

Furthermore, the process of specifying the first area, the second area, and the relationship performed by the information processing device 10 includes a process of specifying the first area, the second area, and the relationship by inputting the obtained video to a machine learning model, and the machine learning model is a model for the HOID trained to identify the information regarding the first area indicating the first class indicating an object including a product and the area where the object appears, the information regarding the second area indicating the second class indicating a person who purchases the product and the area where the person appears, and the interaction between the first class and the second class.

As a result, it becomes possible to more accurately analyze the purchasing behavior of the customer due to a difference in the location where the product is arranged. (System)

Pieces of information including the processing procedures, control procedures, specific names, various kinds of data and parameters described above or illustrated in the drawings may be changed as appropriate, unless otherwise specified. Furthermore, the specific examples, distribution, numerical values, and the like described in the embodiment are merely examples, and may be changed as appropriate.

Furthermore, specific forms of distribution and integration of components of individual devices are not limited to those illustrated in the drawings. That is, all or some of the components may be functionally or physically distributed or integrated in optional units depending on various kinds of loads, use situations, or the like. Moreover, all or some of the individual processing functions of each device may be implemented by a central processing unit (CPU) and a program to be analyzed and executed by the CPU, or may be implemented as hardware by wired logic. (Hardware)

Figure 13:
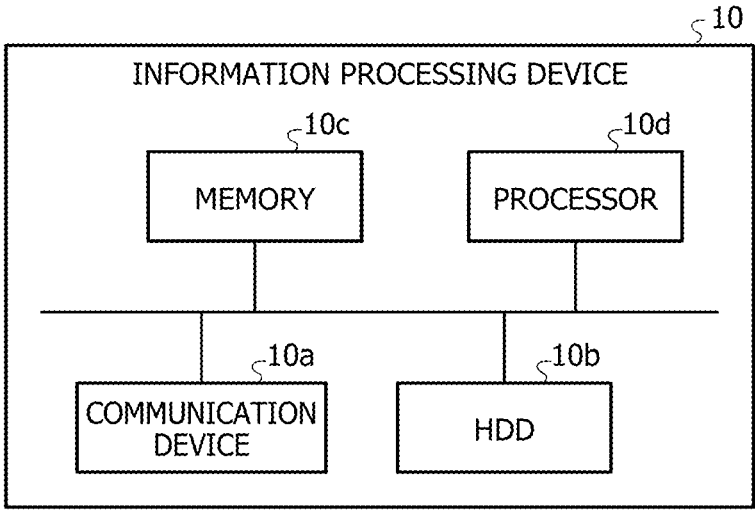
FIG. 13 is a diagram for explaining an exemplary hardware configuration of the information processing device 10.

FIG. 13 is a diagram for explaining an exemplary hardware configuration of the information processing device 10. As illustrated in FIG. 13, the information processing device 10 includes a communication device 10a, a hard disk drive (HDD) 10b, a memory 10c, and a processor 10d. Furthermore, the individual units illustrated in FIG. 13 are mutually coupled by a bus or the like.

The communication device 10a is a network interface card or the like, and communicates with another information processing device. The HDD 10b stores programs and DBs for activating the functions illustrated in FIG. 2.

The processor 10d is a hardware circuit that reads, from the HDD 10b or the like, a program for performing processing similar to that of each processing unit illustrated in FIG. 2 and loads it into the memory 10c to activate a process that implements each function described with reference to FIG. 2 and the like. In other words, this process implements a function similar to that of each processing unit included in the information processing device 10. Specifically, the processor 10d reads a program having functions similar to those of the acquisition unit 21, the specifying unit 22, the generation unit 23, the output unit 24, and the like from the HDD 10b or the like. Then, the processor 10d executes a process for executing processing similar to that of the specifying unit 22 or the like.

In this manner, the information processing device 10 operates as an information processing device that executes operation control processing by reading and executing the program for performing processing similar to that of each processing unit illustrated in FIG. 2. Furthermore, the information processing device 10 may also implement functions similar to those of the examples described above by reading a program from a recording medium using a medium reading device and executing the read program. Note that the program referred to in another example is not limited to being executed by the information processing device 10. For example, the present embodiment may also be applied to a case where another information processing device executes the program or a case where the information processing device 10 and the another information processing device cooperate to execute the program.

Furthermore, the program for performing processing similar to that of each processing unit illustrated in FIG. 2 may be distributed via a network such as the Internet. Furthermore, this program may be recorded in a computer-readable recording medium such as a hard disk, a flexible disk (FD), a compact disc read only memory (CD-ROM), a magneto-optical disk (MO), a digital versatile disc (DVD), or the like, and may be executed by being read from the recording medium by a computer.

Figure 14:
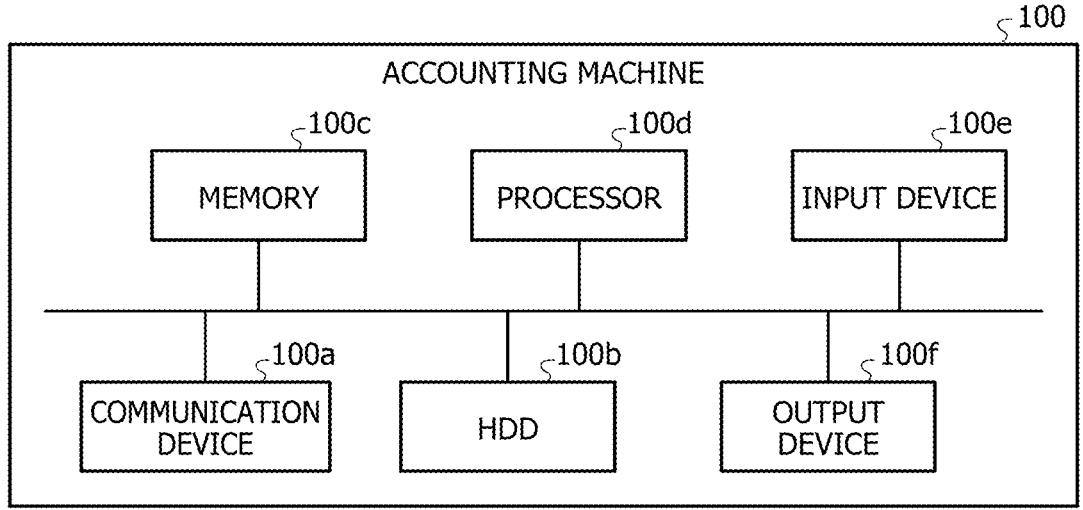
FIG. 14 is a diagram for explaining an exemplary hardware configuration of an accounting machine 100.

FIG. 14 is a diagram for explaining an exemplary hardware configuration of the accounting machine 100. As illustrated in FIG. 14, the accounting machine 100 includes a communication device 100a, an HDD 100b, a memory 100c, a processor 100d, an input device 100e, and an output device 100f. Furthermore, the individual units illustrated in FIG. 14 are mutually coupled by a bus or the like.

The communication device 100a is a network interface card or the like, and communicates with another information processing device. The HDD 100b stores programs and data for activating the individual functions of the accounting machine 100.

The processor 100d is a hardware circuit that reads, from the HDD 100b or the like, a program for performing processing of each function of the accounting machine 100 and loads it into the memory 100c to activate a process that implements each function of the accounting machine 100. In other words, this process implements a function similar to that of each processing unit included in the accounting machine 100.

In this manner, the accounting machine 100 operates as an information processing device that executes operation control processing by reading and executing the program that executes processing of each function of the accounting machine 100. Furthermore, the accounting machine 100 may also implement each function of the accounting machine 100 by reading a program from a recording medium using a medium reading device and executing the read program. Note that the program referred to in another example is not limited to being executed by the accounting machine 100. For example, the present embodiment may also be applied to a case where another information processing device executes the program or a case where the accounting machine 100 and the another information processing device cooperate to execute the program.

Furthermore, the program that executes the processing of each function of the accounting machine 100 may be distributed via a network such as the Internet. Furthermore, this program may be recorded in a computer-readable recording medium such as a hard disk, an FD, a CD-ROM, an MO, a DVD, or the like, and may be executed by being read from the recording medium by a computer.

The input device 100e detects various input operations made by a user, such as an input operation for the program executed by the processor 100d. The input operation includes, for example, a touch operation or the like. In the case of a touch operation, the accounting machine 100 may further include a display device, and the input operation detected by the input device 100e may be a touch operation performed on the display device. The input device 100e may be, for example, a button, a touch panel, a proximity sensor, and the like.

The output device 100f outputs data output from the program executed by the processor 100d via an external device coupled to the accounting machine 100, for example, an external display device or the like. Note that the accounting machine 100 may not include the output device 100/in the case where the accounting machine 100 includes the display device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program for causing a computer to execute a process comprising:

obtaining video obtained by imaging a plurality of product arrangement locations in a store;

analyzing the obtained video to specify, from the video, a first area that includes a product arranged in the store, a second area that includes a customer to purchase the product, and a relationship in which interaction between the product and the customer is identified;

specifying, for each product arrangement location of the plurality of product arrangement locations, an action of the customer grasping the product based on the specified relationship and a position of the customer when the specified relationship is indicated;

counting, for each product arrangement location of the plurality of product arrangement locations, a quantity of the action of the customer grasping the product;

tracking the customer included in the video to identify an accounting machine used by the tracked customer;

specifying, from registration information obtained from the identified accounting machine, a purchase quantity of the product that was subject to the customer grasping action at a product arrangement location where the customer indicated the grasping action;

generating, for each product arrangement location of the plurality of product arrangement locations, attention information that indicates a degree of attention in the each product arrangement location, the attention information including, as the degree of attention, a conversion rate for the each product arrangement location based on the counted quantity of the customer grasping action and the specified purchase quantity; and causing a display device to output, for each product arrangement location of the plurality of product arrangement locations, the conversion rate indicated in the generated attention information in association with the each product arrangement location.

2. The non-transitory computer-readable recording medium according to claim 1, the program causing the computer to execute the process further comprising:

specifying a type of the relationship indicated by the customer at a predetermined location where the product is arranged in the store based on the specified relationship and a position of the customer when the specified relationship is indicated;

counting an actual quantity for each type of the relationship indicated by the customer at the predetermined location; and causing the display device to output the attention information in which the counted actual quantity is associated with the predetermined location.

3. The non-transitory computer-readable recording medium according to claim 1, wherein the causing includes causing the display device to output, for each product arrangement location of the plurality of product arrangement locations, the counted quantity of the customer grasping action in association with the each product arrangement location.

4. The non-transitory computer-readable recording medium according to claim 1, wherein the causing includes causing the display device to output, for each product arrangement location of the plurality of product arrangement locations, the specified purchase quantity in association with the each product arrangement location.

5. The non-transitory computer-readable recording medium according to claim 1, wherein the specifying the first area, the second area, and the relationship includes:

specifying the first area, the second area, and the relationship by inputting the obtained video to a machine learning model, and the machine learning model includes a model for human object interaction detection (HOID) trained to identify information related to the first area that indicates a first class that indicates an object that includes the product and an area where the object appears, information related to the second area that indicates a second class that indicates a person who purchases the product and an area where the person appears, and interaction between the first class and the second class.

6. An information processing method comprising:

obtaining video obtained by imaging a plurality of product arrangement locations in a store;

analyzing the obtained video to specify, from the video, a first area that includes a product arranged in the store, a second area that includes a customer to purchase the product, and a relationship in which interaction between the product and the customer is identified;

specifying, for each product arrangement location of the plurality of product arrangement locations, an action of the customer grasping the product based on the specified relationship and a position of the customer when the specified relationship is indicated;

counting, for each product arrangement location of the plurality of product arrangement locations, a quantity of the action of the customer grasping the product;

tracking the customer included in the video to identify an accounting machine used by the tracked customer;

specifying, from registration information obtained from the identified accounting machine, a purchase quantity of the product that was subject to the customer grasping action at a product arrangement location where the customer indicated the grasping action;

generating, for each product arrangement location of the plurality of product arrangement locations, attention information that indicates a degree of attention in the each product arrangement location, the attention information including, as the degree of attention, a conversion rate for the each product arrangement location based on the counted quantity of the customer grasping action and the specified purchase quantity; and causing a display device to output, for each product arrangement location of the plurality of product arrangement locations, the conversion rate indicated in the generated attention information in association with the each product arrangement location.

7. The information processing method according to claim 6, further comprising:

specifying a type of the relationship indicated by the customer at a predetermined location where the product is arranged in the store based on the specified relationship and a position of the customer when the specified relationship is indicated;

counting an actual quantity for each type of the relationship indicated by the customer at the predetermined location; and causing the display device to output the attention information in which the counted actual quantity is associated with the predetermined location.

8. The information processing method according to claim 6, wherein the causing includes causing the display device to output, for each product arrangement location of the plurality of product arrangement locations, the counted quantity of the customer grasping action in association with the each product arrangement location.

9. The information processing method according to claim 6, wherein the causing includes causing the display device to output, for each product arrangement location of the plurality of product arrangement locations, the specified purchase quantity in association with the each product arrangement location.

10. The information processing method according to claim 6, wherein the specifying the first area, the second area, and the relationship includes:

specifying the first area, the second area, and the relationship by inputting the obtained video to a machine learning model, and the machine learning model includes a model for human object interaction detection (HOID) trained to identify information related to the first area that indicates a first class that indicates an object that includes the product and an area where the object appears, information related to the second area that indicates a second class that indicates a person who purchases the product and an area where the person appears, and interaction between the first class and the second class.

11. An information processing device comprising:

a memory; and a processor coupled to the memory and configured to perform processing including:

obtaining video obtained by imaging a plurality of product arrangement locations in a store;

analyzing the obtained video to specify, from the video, a first area that includes a product arranged in the store, a second area that includes a customer to purchase the product, and a relationship in which interaction between the product and the customer is identified;

specifying, for each product arrangement location of the plurality of product arrangement locations, an action of the customer grasping the product based on the specified relationship and a position of the customer when the specified relationship is indicated;

counting, for each product arrangement location of the plurality of product arrangement locations, a quantity of the action of the customer grasping the product;

tracking the customer included in the video to identify an accounting machine used by the tracked customer;

specifying, from registration information obtained from the identified accounting machine, a purchase quantity of the product that was subject to the customer grasping action at a product arrangement location where the customer indicated the grasping action;

generating, for each product arrangement location of the plurality of product arrangement locations, attention information that indicates a degree of attention in the each product arrangement location, the attention information including, as the degree of attention, a conversion rate for the each product arrangement location based on the counted quantity of the customer grasping action and the specified purchase quantity; and causing a display device to output, for each product arrangement location of the plurality of product arrangement locations, the conversion rate indicated in the generated attention information in association with the each product arrangement location.

12. The information processing device according to claim 11, wherein the processor is configured to:

specify a type of the relationship indicated by the customer at a predetermined location where the product is arranged in the store based on the specified relationship and a position of the customer when the specified relationship is indicated;

count an actual quantity for each type of the relationship indicated by the customer at the predetermined location; and cause the display device to output the attention information in which the counted actual quantity is associated with the predetermined location.

13. The information processing device according to claim 11, wherein the causing includes causing the display device to output, for each product arrangement location of the plurality of product arrangement locations, the counted quantity of the customer grasping action in association with the each product arrangement location.

14. The information processing device according to claim 11, wherein the causing includes causing the display device to output, for each product arrangement location of the plurality of product arrangement locations, the specified purchase quantity in association with the each product arrangement location.

15. The information processing device according to claim 11, wherein the specifying the first area, the second area, and the relationship includes:

specifying the first area, the second area, and the relationship by inputting the obtained video to a machine learning model, and the machine learning model includes a model for human object interaction detection (HOID) trained to identify information related to the first area that indicates a first class that indicates an object that includes the product and an area where the object appears, information related to the second area that indicates a second class that indicates a person who purchases the product and an area where the person appears, and interaction between the first class and the second class.

* * * * *